(12) United States Patent
Li

(10) Patent No.: US 12,445,445 B1
(45) Date of Patent: Oct. 14, 2025

(54) RESOURCE PROTECTION FOR A MICROSERVICE-BASED APPLICATION

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/616,692

(22) Filed: Mar. 26, 2024

(51) Int. Cl.
*H04L 9/40* (2022.01)

(52) U.S. Cl.
CPC .......... *H04L 63/10* (2013.01); *H04L 63/0807* (2013.01)

(58) Field of Classification Search
CPC ... H04L 67/10; H04L 63/0807; H04L 67/133; H04L 63/10; H04L 63/08; H04L 63/102; H04L 63/20; G06F 9/5072; G06F 9/5027; G06F 2009/4557; G06F 9/45558; G06F 9/45533
See application file for complete search history.

(56) References Cited

U.S. PATENT DOCUMENTS

| | | | | |
|---|---|---|---|---|
| 10,044,723 B1 * | 8/2018 | Fischer | ................ | H04L 63/102 |
| 10,057,246 B1 * | 8/2018 | Drozd | ................... | G06F 21/604 |
| 11,695,561 B2 * | 7/2023 | Cannata, Jr. | .......... | H04L 9/3073 |
| | | | | 713/156 |
| 2013/0007891 A1 * | 1/2013 | Mogaki | ............... | G06F 21/6218 |
| | | | | 726/27 |
| 2015/0040189 A1 * | 2/2015 | Fujii | ....................... | H04W 4/60 |
| | | | | 726/3 |
| 2016/0119351 A1 * | 4/2016 | Tamura | ................... | H04L 63/10 |
| | | | | 726/4 |
| 2019/0098106 A1 * | 3/2019 | Mungel | ................. | H04L 67/564 |
| 2024/0152379 A1 * | 5/2024 | Krishna | ............. | H04L 63/0263 |
| 2025/0080530 A1 * | 3/2025 | Trinelli | ............... | H04L 63/0807 |

* cited by examiner

*Primary Examiner* — Jason D Cardone
(74) *Attorney, Agent, or Firm* — Buckley, Maschoff & Talwalkar LLC

(57) ABSTRACT

Systems and methods include reception of a first request, a first token and a first request identifier of the first request at a first microservice and, while processing the first request, determination to access first data of a first user of a first tenant, querying of a data source for an identifier of a second tenant and an identifier of a second user associated with the first request identifier, determination that the first tenant and the second tenant are identical and the first user and the second user are identical, and, in response to determining that the first tenant and the second tenant are identical and the first user and the second user are identical, accessing of the first data.

18 Claims, 8 Drawing Sheets

| UUID | Timestamp | tenantID | userID | isSuperTenant | isSuperUser |
|---|---|---|---|---|---|
| 70--62-f32 | 23-01-01T12:34:45. | tenant123 | user123 | False | True |
| ~~~~~~~~ | ~~~~~~~~~ | ~~~~ | ~~~~ | ~~~~ | ~~~~ |
| ~~~~~~~~ | ~~~~~~~~~ | ~~~~ | ~~~~ | ~~~~ | ~~~~ |
| ~~~~~~~~ | ~~~~~~~~~ | ~~~~ | ~~~~ | ~~~~ | ~~~~ |

*FIG. 3*

RESOURCE PROTECTION FOR A MICROSERVICE-BASED APPLICATION

BACKGROUND

A microservice-based application consists of distinct functions implemented using independently-deployed microservices. A request directed to a microservice-based application is processed using several microservices, each of which executes in its own computing process in a separate computing system (e.g., server/virtual machine/container) and is independently accessible. Each microservice of a microservice-based application may be modified and redeployed without redeploying the entire application.

Microservices are often cloud-based in order to take advantage of the resource elasticity, redundancy, economies of scale and other benefits provided by cloud platforms. In view of such cloud-based deployments, microservice-based applications often support multiple tenants, such that all tenants will share the same software. Ideally, each tenant's resources (e.g., data) are strictly isolated so that one tenant cannot view or edit resources of another tenant.

Software bugs may allow a tenant of a multi-tenant application to read or edit another tenant's resources. These bugs may be triggered in only a few rare situations and are therefore difficult to detect during development and testing. Systems are desired to provide increased protection against unauthorized cross-tenant data access in a microservice-based application.

BRIEF DESCRIPTION OF THE DRAWINGS

FIG. 3 is a tabular representation of request-specific login information according to some embodiments.

DETAILED DESCRIPTION

The following description is provided to enable any person in the art to make and use the described embodiments. Various modifications, however, will remain readily-apparent to those in the art.

Some embodiments facilitate resource protection in a microservices-based application. For example, a microservice may require access to data during servicing of an incoming request to a microservice-based application. The microservice typically accesses the data based on a current tenant and user. To prevent unauthorized access to the data of the current tenant and user, and prior to each data access, the current tenant and user recognized by the microservice are compared to the tenant and user which correspond to the login information of the incoming request. If the tenant and user do not match, access is denied.

Figure 1:
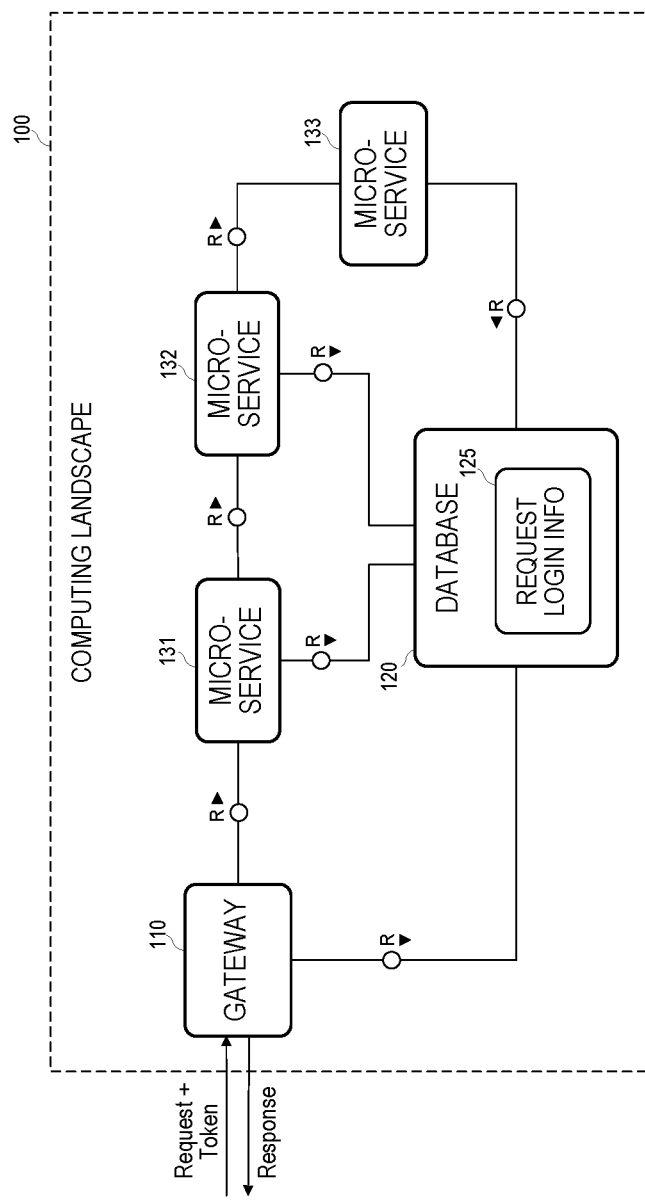
FIG. 1 illustrates a microservice-based system providing request-based resource protection according to some embodiments.

FIG. 1 illustrates a system according to some embodiments. The illustrated components of FIG. 1 may be implemented using any suitable combinations of computing hardware and/or software that are or become known. Such combinations may include on-premise servers, cloud-based servers, and/or elastically-allocated virtual machines. In some embodiments, two or more components are implemented by a single computing device.

Computing landscape 100 may comprise any number of hardware and software components which provide functionality to one or more users (not shown). In the present example, computing landscape 100 includes gateway 110 providing routing of incoming requests associated with one or more microservice-based applications, as well as authentication, authorization, and load balancing. Database 120 is accessible to gateway 110 and stores request-specific login information 125 as will be described below.

Computing landscape 100 also includes microservices 131-133. Each of microservices 131-133 runs in a separate execution environment (e.g., a separate process in a separate computing system). Microservices 131-133 may communicate with one another using lightweight network communication mechanisms such as a resource Application Programming Interface (API) via Hyper Text Transfer Protocol (HTTP) request-response messages, but embodiments are not limited thereto.

The execution of microservices 131-133 is orchestrated to provide functionality of a multi-tenant application as is known in the art. For example, gateway 110 receives an external request (e.g., an API call) associated with an application from a client device. The request includes a security token identifying a tenant and a user of that tenant. Gateway 110 performs required authentication and authorization functions and, if successful, stores request-specific login information 125 in database 120.

The stored login information 125 includes an identifier of the incoming request, an identifier of the tenant identified by the token and an identifier of the user identified by the token. As will be described in detail below, the stored login information may also include other information associated with the request, the tenant and/or the user.

Gateway 110 also determines, based on the request, the token, and its own configuration and logic, to forward the request to microservice 131. Gateway 110 therefore forwards the request to microservice 131, which performs corresponding processing in response. During the processing, it may be necessary for microservice 131 to read and/or edit stored data. The data may be stored in any storage system to which microservice 131 has access.

Prior to reading and/or editing the stored data, microservice 131 queries database 120 with an identifier of the request to retrieve the tenant and user identifiers associated with the request. Microservice 131 then compares the retrieved tenant and user identifiers with identifiers of the current tenant and user (i.e., the tenant and user whose data will be accessed by the read/edit operation) and proceeds with the data access only if the identifiers match. In some embodiments, data access proceeds even if the identifiers do not match if the tenant or user identified within login information 125 is authorized for cross-tenant and/or cross-user data access.

Microservice 131 performs the above process before each data access. Microservice 131 may call microservice 132 during its processing and microservice 132 may similarly call microservice 133 during its processing. Each call includes an identifier of the request and microservices 132 and 132 may use the request identifier to acquire tenant and user identifiers from database 120 prior to each data access as described above.

An exception is thrown if any tenant and user identifier mismatches are detected during the processing of any microservice. Such an exception propagates to gateway 110 and to the requesting client device. If no mismatches are detected, microservice 132 receives a response from microservice 133 and returns a response to microservice 131. Microservice 131 then returns a response to gateway 110 for transmission to the client device.

Embodiments are not limited to the foregoing description, as a pair of microservices may exchange more than one request/response during processing of a single incoming external request. Moreover, one or more microservices may perform additional processing after receiving a response from a microservice and prior to returning a response to a requestor microservice. Embodiments are not limited to a single application or to the components of computing landscape 100.

Computing landscape 100 may comprise a cloud-native system utilizing a Kubernetes cluster. Kubernetes is an open-source system for automating deployment, scaling, and management of containerized applications. Each component of computing landscape 100 may therefore be implemented by one or more servers (real and/or virtual) or containers.

Request login information 125 may be read frequently during productive operation of computing landscape 100. To enhance performance, database 120 may comprise a key-value in-memory database, such as but not limited to a Redis cluster. Moreover, after receiving a requested record of request login information 125 from database 120, a microservice may store the record in its local memory until the incoming request is fulfilled.

Figure 2:
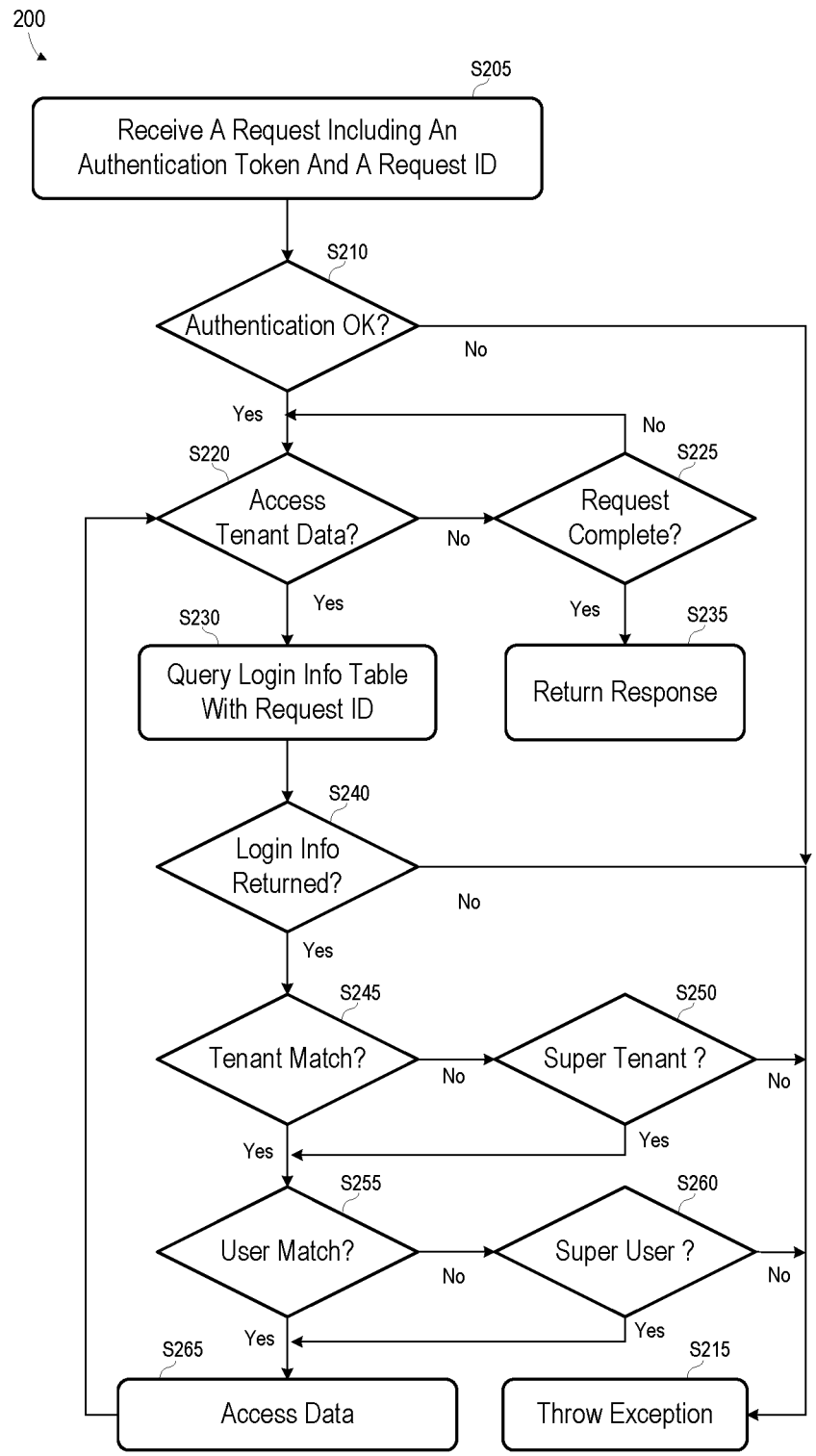
FIG. 2 is a flow diagram of a process performed by a microservice to provide request-based resource protection according to some embodiments.

FIG. 2 is a flow diagram of process 200 which may be performed by a microservice to provide request-based resource protection according to some embodiments. Process 200 and the other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to process 200, it will be assumed that an external request associated with an application is received from a client device. In one example, a user may operate a client device (e.g., a desktop computer) to execute a Web browser application. The user may select or otherwise input a Uniform Resource Locator (URL) associated with a cloud-based application, causing the Web browser to send a request to a cloud gateway corresponding to the URL. As mentioned above, the request may include a security token and the cloud gateway may perform authentication and authorization using the token.

Next, the gateway stores login information associated with the request in a central data store, such as a database. The stored login information includes an identifier of the incoming request, an identifier of the tenant identified by the token and an identifier of the user identified by the token.

FIG. 3 illustrates request-specific records 300 stored by a gateway according to some embodiments. Embodiments are not limited to the structure or contents of records 300. Records 300 may be stored in any suitable format and/or database type.

The UUID is the primary key of a record and identifies the incoming external request. The UUID is maintained during the whole lifecycle of the request, regardless of the number or identity of hosts and microservices through which the request routes. The UUID may be generated by the gateway. The UUID may be considered a Trace ID and may be generated by the gateway and passed between the gateway and the microservices using, for example, a framework such as Dapper, Pinpoint and Sleuth.

The Timestamp indicates the date and time the request was received. The Timestamp may be used to prune records 300, as an additional identifier of the request, or otherwise. The TenantID and UserID identify the login tenant and user of the request, as indicated by the token received with the request.

isSuperTenant is a boolean value indicating whether the tenant identified by the TenantID is a "super" tenant which is authorized to read and edit data of another tenant. Similarly, isSuperUser is a boolean value indicating whether the user identified by the UserID is a "super" user who is authorized to read and edit data of another user of its tenant. Whether or not a tenant or user are "super" may be specified by an operator of landscape 100 (e.g., a cloud provider), a provider of the application with which the request is associated (e.g., an application provider) and/or other entities.

The gateway also directs the request to a corresponding microservice. The request includes the authentication token received by the gateway and an identifier of the request. The identifier of the request may be passed to the microservice via a special header of an HTTP request as is known in the art.

Figure 4:
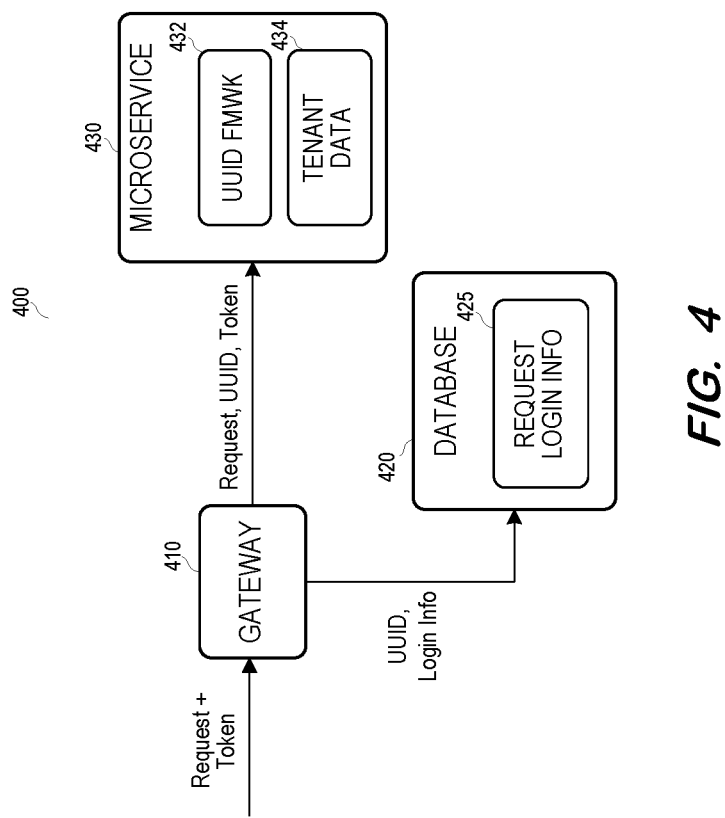
FIG. 4 illustrates saving request-specific login information to a central repository of a microservice-based system according to some embodiments.

FIG. 4 illustrates saving request-specific login information to a central repository of a microservice-based system according to some embodiments. Gateway 410 receives an external request and a corresponding token and stores a UUID associated with the request and login information in request login information 425 of database 420. Gateway 410 also transmits the request, the UUID and the token, which are received by microservice 430 at S205 of process 200.

Microservice 430 may execute any desired authentication protocol at S210. The authentication protocol may be based on the token and on the semantics of the request. If authentication fails, an exception is thrown at S215 and process 200 terminates. Flow proceeds to S220 if authentication is successful.

Flow cycles between S220 and S225 as the microservice processes the request, until it is determined (at S220) to access tenant data or (at S225) that processing of the request is complete. It will be assumed that it is first determined to access tenant data at S220, causing flow to proceed to S230.

At S230, a login information table is queried using the received UUID. S230 intends to determine tenant and user identifiers associated with the request. At S240, it is determined whether login information was returned in response to the query. If no login information was returned (e.g., due to the absence of stored login information corresponding to the UUID, a communication error, unavailability of the database), an exception is thrown at S215.

Figure 5:
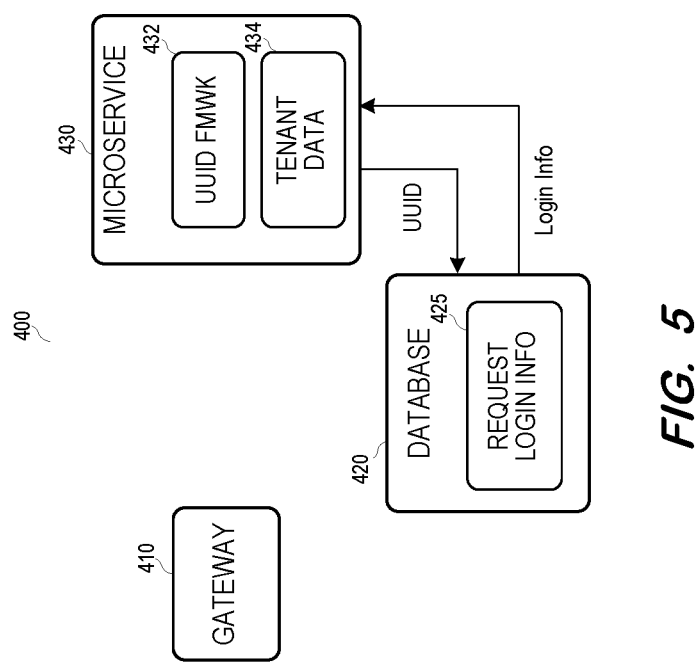
FIG. 5 illustrates acquisition of request-specific login information from a central repository of a microservice-based system according to some embodiments.

FIG. 5 illustrates querying of database 420 using the received UUID at S230. The query is sent in response to a determination at S220 to access tenant data 434 associated with a particular tenant identifier and user identifier (i.e., the "current" tenant identifier and user identifier). In response to the query, database 420 returns login information associated with the UUID. According to the present example, it will be assumed that the returned login information includes values of each of the fields shown in records 300 and flow therefore proceeds to S245.

The microservice compares the returned tenant identifier to the current tenant identifier at S245. If the tenant identifiers are not identical, flow proceeds to S250 to determine whether the tenant associated with the returned login information is a super tenant. This determination may be based on the returned Boolean value of the isSuperTenant field associated with the UUID. If the tenant is not a super tenant, an exception is thrown at S215.

Flow proceeds to S255 if the tenant identifiers are determined to match or if the returned login information indicates a super tenant. The microservice compares the returned user identifier to the current user identifier at S255. Flow proceeds to S260 if the identifiers are not identical, to determine, based on the returned Boolean value of the isSuperUser field associated with the UUID, whether the user associated with the returned login information is a super user. An exception is thrown at S215 if the user is not a super user.

If the user identifiers are determined to match at S255 or if the returned login information is determined to indicate a super tenant at S260, flow proceeds to S265. The microservice accesses the required data at S265. Flow returns to S220 to cycle between S220 and S225 as the microservice continues to process the request, until it is determined (at S220) to access tenant data or (at S225) that processing of the request is complete. If it is again determined to access tenant data at S220, flow proceeds to S230 and continues as described above. The current tenant and user in the next iteration of S230-S265 may be the same or different than the current tenant and user of the previous iteration.

A response is returned at S235 to the entity from which the request was received if it is determined at S225 that processing of the request is complete. In some embodiments, processing of the request may include the transmission of requests to one or more other microservices and waiting for responses therefrom. Flow cycles between S220 and S225 during such waiting. Accordingly, a microservice may execute S220 through S265 of process 200, send a request to another microservice, receive a response from the other microservice, and again execute S220 through S265 based on the response.

Figure 6:
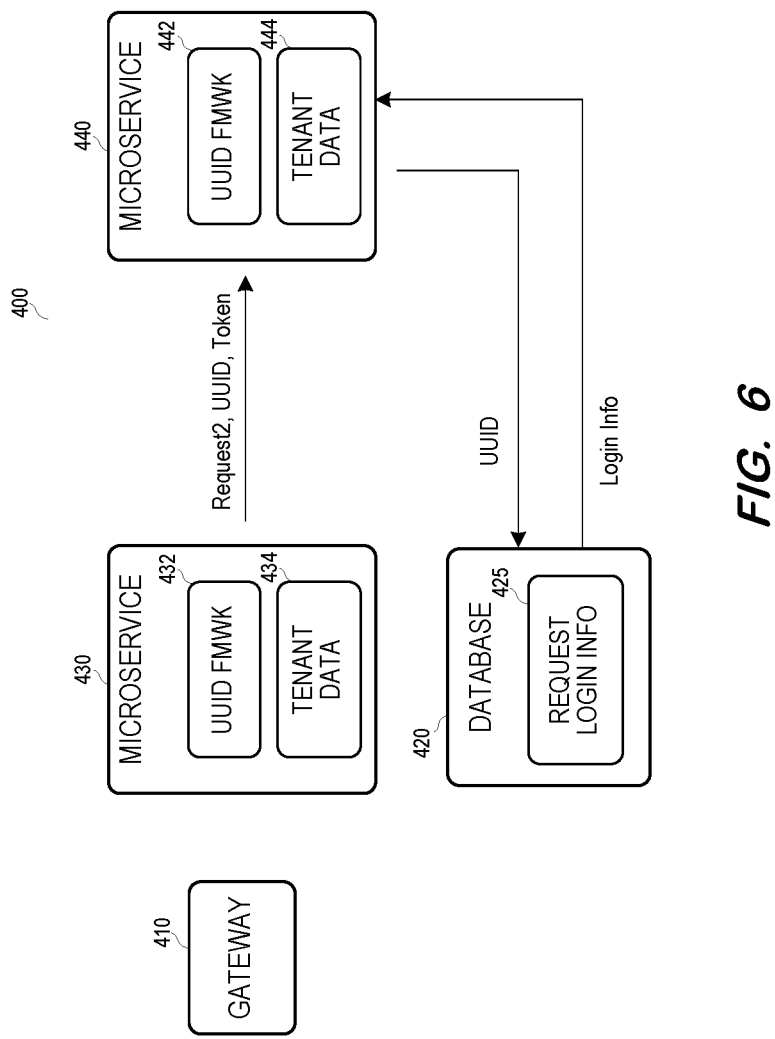
FIG. 6 illustrates an inter-service call and acquisition of request-specific login information from a central repository of a microservice-based system according to some embodiments.

FIG. 6 illustrates transmission of a request between microservices according to some embodiments. As mentioned above, microservice 430 may determine to transmit a request to microservice 440 in order to fulfill the original request received from gateway 410. The request (i.e., Request2) is sent to microservice 440 along with the token received from gateway 410. Microservice 430 also uses UUID framework 432 to manage and pass the UUID identifying the original request (i.e., the present workflow) to similar UUID framework 442 of microservice 440.

According to some embodiments, microservice 440 then executes process 200 in view of the received request, token and UUID. Such execution may, as shown in FIG. 6, include querying request login information 425 of database 420 for login information associated with the UUID. Therefore, processing of an external request may include several microservices executing process 200 in parallel. Since process 200 may be performed by each microservice, the microservices may re-use program code implementing process 200 in some embodiments.

Figure 7:
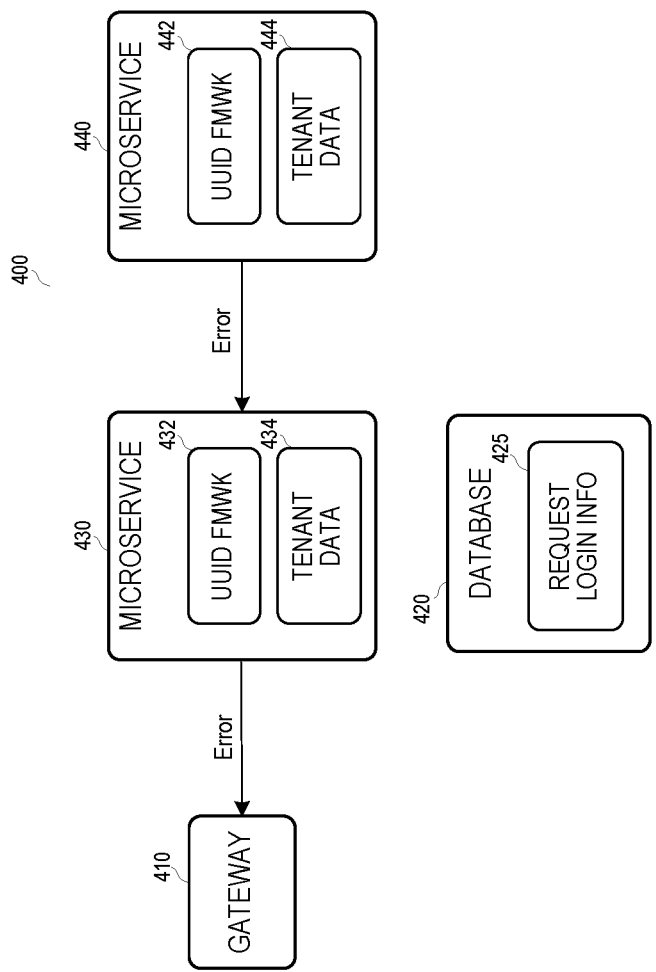
FIG. 7 illustrates the occurrence of a resource access error due to a determination of mismatched tenant or user login information according to some embodiments.

As noted above, several situations may result in throwing an exception at S215. FIG. 7 illustrates a scenario in which execution of process 200 causes microservice 440 to throw an exception at S215. As shown, an error message is returned to microservice 430 and the error massage is propagated to gateway 410.

Figure 8:
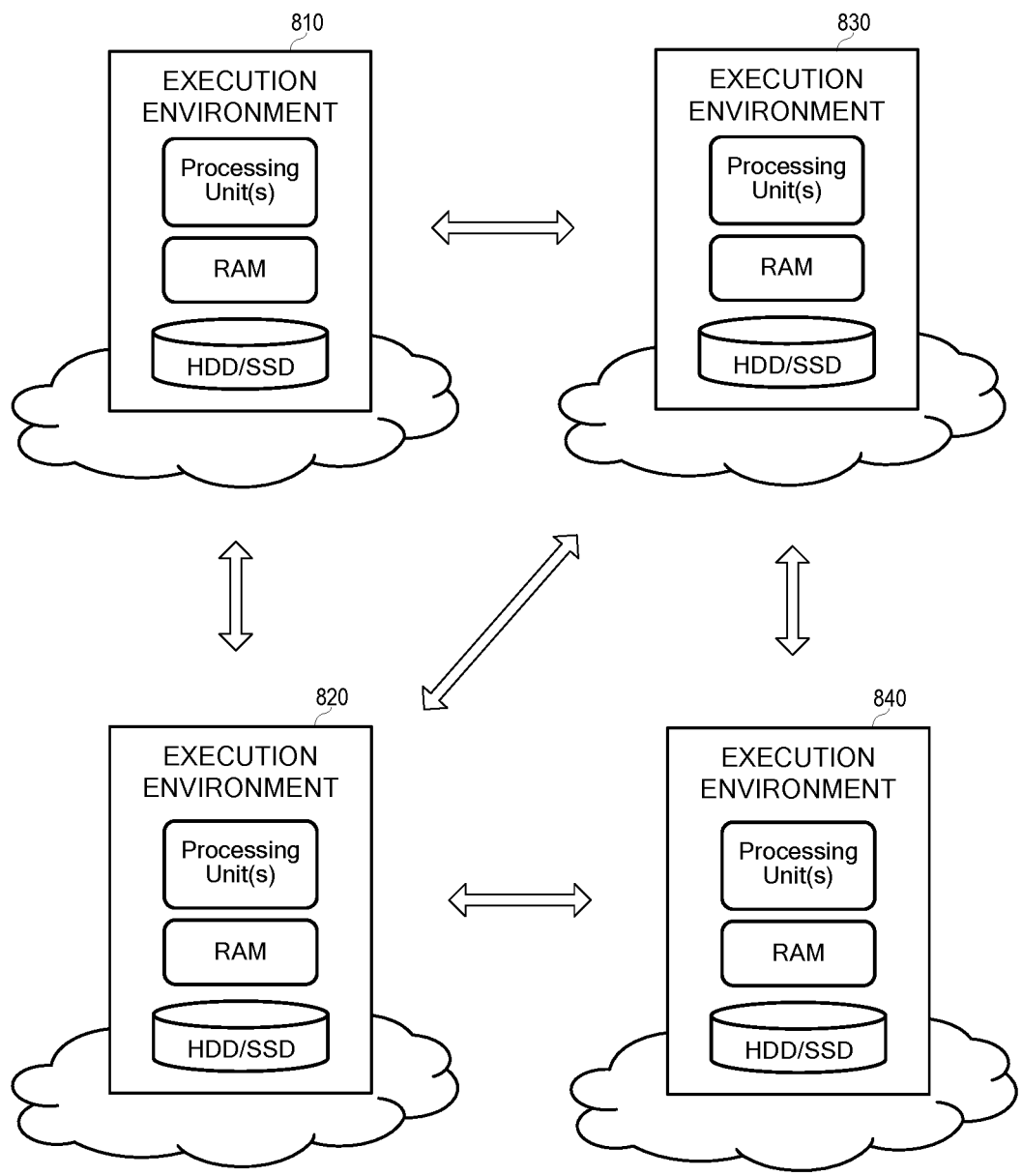
FIG. 8 illustrates a cloud-based architecture according to some embodiments.

FIG. 8 illustrates a cloud-based database deployment according to some embodiments. The illustrated components may comprise cloud-based compute resources residing in one or more public clouds providing self-service and immediate provisioning, autoscaling, security, compliance and identity management features.

Execution environments 810-840 may comprise servers or virtual machines of a Kubernetes cluster. Execution environments 810-840 may support containerized applications which provide one or more services to users. Execution environments 810 and 820 may execute a gateway and a database, respectively, and execution environments 830 and 840 may execute microservices of a microservice-based application as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data source;
a first microservice of a microservice-based application;
a gateway to:
receive a first request to the microservice-based application and a security token;
determine a tenant identifier and a user identifier based on the security token;

store the tenant identifier and the user identifier in the data source in association with a first request identifier of the first request; and transmit the first request, the security token and the first request identifier to the first microservice, wherein the first microservice is to:

receive the first request for the first microservice to access first data, the security token and the first request identifier;

execute an authentication protocol to authenticate the first request based, at least in part, on the first token; and while processing the first request:

determine to access the first data of a first user of a first tenant in response to authenticating the first request;

query the data source for the tenant identifier and the user identifier associated with the first request identifier;

determine that the first tenant is associated with the tenant identifier and the first user is associated with the user identifier; and in response to the determination that the first tenant is associated with the tenant identifier and the first user is associated with the user identifier, the first microservice accesses the first data and performs at least one read operation or edit operation on the first data.

2. A system according to claim 1, the first microservice to: while processing the first request:

determine to access second data of a third user of a third tenant;

determine that the third tenant is not associated with the tenant identifier;

determine that the second tenant is a super tenant;

determine that the third user and the second user are identical; and in response to the determination that the second tenant is a super tenant and the third user and the second user are identical, access the second data, wherein query of the data source comprises querying of the data source for an indicator associated with the first request identifier and indicating the second tenant is a super tenant.

3. A system according to claim 1, the first microservice to: while processing the first request:

determine to access second data of a third user of a third tenant;

determine that the third tenant and the second tenant are identical;

determine that the third user and the second user are not identical;

determine that the second user is a super user; and in response to the determination that the second user is a super user and the third tenant and the second tenant are identical, access the second data, wherein query of the data source comprises querying of the data source for an indicator associated with the first request identifier and indicating the second user is a super user.

4. A system according to claim 1, the first microservice to: while processing the first request:

transmit a second request, the first token and the first request identifier to a second system.

5. A system according to claim 1, the first microservice to: while processing the first request:

determine to access second data of a third user of a third tenant;

determine that the third tenant and the second tenant are not identical; and in response to the determination that the third tenant and the second tenant are not identical, throw an exception in response to the first request.

6. A system according to claim 1, the first microservice to: while processing the first request:

determine to access second data of a third user of a third tenant;

determine that the third tenant and the second tenant are identical;

determine that the third user and the second user are not identical; and in response to the determination that the third user and the second user are not identical, throw an exception in response to the first request.

7. A system comprising:

a memory storing executable program code; and one or more processors to execute the executable program code to cause the system to:

receive a first request for a microservice to access first data, a first token and a first request identifier of the first request;

execute an authentication protocol to authenticate the first request based, at least in part, on the first token;

determine to access the first data of a first user of a first tenant in response to authenticating the first request;

query a data source for an identifier of a second tenant and an identifier of a second user associated with the first request identifier;

determine that the first tenant and the second tenant are identical and the first user and the second user are identical; and in response to the determination that the first tenant and the second tenant are identical and the first user and the second user are identical, the microservice accesses the first data and performs at least one read operation or edit operation on the first data.

8. A system according to claim 7, the one or more processors to execute the executable program code to cause the system to:

determine to access second data of a third user of a third tenant;

determine that the third tenant and the second tenant are not identical;

determine that the second tenant is a super tenant;

determine that the third user and the second user are identical; and in response to the determination that the second tenant is a super tenant and the third user and the second user are identical, access the second data, wherein query of the data source comprises querying of the data source for an indicator associated with the first request identifier and indicating the second tenant is a super tenant.

9. A system according to claim 7, the one or more processors to execute the executable program code to cause the system to:

determine to access second data of a third user of a third tenant;

determine that the third tenant and the second tenant are identical;

determine that the third user and the second user are not identical;

determine that the second user is a super user; and in response to the determination that the second user is a super user and the third tenant and the second tenant are identical, access the second data, wherein query of the data source comprises querying of the data source for an indicator associated with the first request identifier and indicating the second user is a super user.

10. A system according to claim 7, the one or more processors to execute the executable program code to cause the system to:

transmit a second request, the first token and the first request identifier to a second system.

11. A system according to claim 7, the one or more processors to execute the executable program code to cause the system to:

determine to access second data of a third user of a third tenant;

determine that the third tenant and the second tenant are not identical; and in response to the determination that the third tenant and the second tenant are not identical, throw an exception in response to the first request.

12. A system according to claim 7, the one or more processors to execute the executable program code to cause the system to:

determine to access second data of a third user of a third tenant;

determine that the third tenant and the second tenant are identical;

determine that the third user and the second user are not identical; and in response to the determination that the third user and the second user are not identical, throw an exception in response to the first request.

13. A method comprising:

receiving a first request, a first token and a first request identifier of the first request at a first microservice for the first microservice to access first data; and while processing the first request:

execute an authentication protocol to authenticate the first request based, at least in part, on the first token;

determining to access the first data of a first user of a first tenant in response to authenticating the first request;

querying a data source for an identifier of a second tenant and an identifier of a second user associated with the first request identifier;

determining that the first tenant and the second tenant are identical and the first user and the second user are identical; and in response to determining that the first tenant and the second tenant are identical and the first user and the second user are identical, accessing, by the first microservice, the first data and performing at least one read operation or edit operation on the first data.

14. A method according to claim 13, further comprising: while processing the first request:

determining to access second data of a third user of a third tenant;

determining that the third tenant and the second tenant are not identical;

determining that the second tenant is a super tenant;

determining that the third user and the second user are identical; and in response to determining that the second tenant is a super tenant and the third user and the second user are identical, accessing the second data, wherein querying the data source comprises querying the data source for an indicator associated with the first request identifier, the indicator indicating the second tenant is a super tenant.

15. A method according to claim 13, further comprising: while processing the first request:

determining to access second data of a third user of a third tenant;

determining that the third tenant and the second tenant are identical;

determining that the third user and the second user are not identical;

determining that the second user is a super user; and in response to determining that the second user is a super user and the third tenant and the second tenant are identical, accessing the second data, wherein querying the data source comprises querying the data source for an indicator associated with the first request identifier, the indicator indicating the second user is a super user.

16. A method according to claim 13, further comprising: while processing the first request, transmitting a second request, the first token and the first request identifier to a second microservice.

17. A method according to claim 13, further comprising: while processing the first request:

determining to access second data of a third user of a third tenant;

determining that the third tenant and the second tenant are not identical; and in response to determining that the third tenant and the second tenant are not identical, throwing an exception in response to the first request.

18. A method according to claim 13, further comprising: while processing the first request:

determining to access second data of a third user of a third tenant;

determining that the third tenant and the second tenant are identical;

determining that the third user and the second user are not identical; and in response to determining that the third user and the second user are not identical, throwing an exception in response to the first request.

* * * * *